(12) United States Patent
Hyun et al.

(10) Patent No.: US 10,826,660 B2
(45) Date of Patent: Nov. 3, 2020

(54) METHOD AND APPARATUS FOR TRANSMITTING AND RECEIVING AUDIO DATA IN BLUETOOTH LOW ENERGY-BASED WIRELESS COMMUNICATION SYSTEM

(71) Applicant: Samsung Electronics Co., Ltd., Gyeonggi-do (KR)

(72) Inventors: Sung-Hwan Hyun, Gyeonggi-do (KR); Rasmus Abildgren, Oest (DK); Kook-Hyung Lee, Seoul (KR); Su-Hwan Kim, Gyeonggi-do (KR); Tae-Sung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 550 days.

(21) Appl. No.: 14/725,563

(22) Filed: May 29, 2015

(65) Prior Publication Data
US 2015/0365208 A1    Dec. 17, 2015

Related U.S. Application Data

(60) Provisional application No. 62/010,820, filed on Jun. 11, 2014.

(30) Foreign Application Priority Data

Apr. 30, 2015 (KR) .......................... 10-2015-0062109

(51) Int. Cl.
*H04L 5/00* (2006.01)
*H04W 4/80* (2018.01)

(52) U.S. Cl.
CPC ............. *H04L 5/0044* (2013.01); *H04W 4/80* (2018.02); *H04L 5/0094* (2013.01)

(58) Field of Classification Search
None
See application file for complete search history.

(56) References Cited

U.S. PATENT DOCUMENTS

| 2004/0136352 A1* | 7/2004 | Fu ..................... H04B 7/18578 370/341 |
| 2008/0081560 A1* | 4/2008 | Jougit .................. H04W 48/10 455/41.2 |
| 2009/0232041 A1* | 9/2009 | Smith ................... H04L 1/1867 370/312 |
| 2013/0045684 A1* | 2/2013 | Linde ................... H04W 80/02 455/41.2 |
| 2013/0102251 A1 | 4/2013 | Linde et al. |
| 2016/0255668 A1* | 9/2016 | Wei ....................... H04W 8/005 455/434 |

\* cited by examiner

*Primary Examiner* — Jeffrey M Rutkowski
*Assistant Examiner* — Mehedi S Aley
(74) *Attorney, Agent, or Firm* — The Farrell Law Firm, P.C.

(57) ABSTRACT

A method for transmitting audio data by a master device in a Bluetooth Low Energy (BLE)-based wireless communication system is provided. The method includes configuring a data packet to include identification information indicating whether the audio data is included in a payload of the data packet and transmitting the data packet to at least one slave device.

34 Claims, 7 Drawing Sheets

```
      401                    403
 ┌──────────────┬──────────────────────┐
 │  IDENTIFIER  │  AUDIO DATA LENGTH   │
 │   (1 bit)    │      (7 bits)        │
 └──────────────┴──────────────────────┘
```

METHOD AND APPARATUS FOR TRANSMITTING AND RECEIVING AUDIO DATA IN BLUETOOTH LOW ENERGY-BASED WIRELESS COMMUNICATION SYSTEM

PRIORITY

This application claims priority under 35 U.S.C. § 119(e) to U.S. Provisional Application Ser. No. 62/010,820, which was filed in the U.S. Patent and Trademark Office on Jun. 11, 2014, and under 35 U.S.C. § 119(a) to Korean Patent Application Serial No. 10-2015-0062109, which filed in the Korean Intellectual Property Office on Apr. 30, 2015, the entire disclosure of each of which are incorporated herein by reference.

BACKGROUND

1. Field of the Disclosure

The present disclosure relates generally to a method and apparatus for transmitting and receiving data in a wireless communication system, and more particularly, to a method and apparatus for transmitting and receiving data in a Bluetooth Low Energy (BLE)-based wireless communication system.

2. Description of the Related Art

Bluetooth is a technology standard for Personal Area Network (PAN), which was developed in 1994, and is used to implement short-range wireless communication between various wireless devices such as mobile terminals and laptop computers. Bluetooth Special Interest Group (SIG), which is a standard organization in charge of the Bluetooth technology, has proposed the Bluetooth 4.0 specification that includes Bluetooth Low Energy (BLE) as Bluetooth low energy technology, and the Bluetooth standard has now reached the Bluetooth 4.2 specification. The BLE is technology that enables data communication with low power in Bluetooth.

Figure 1:
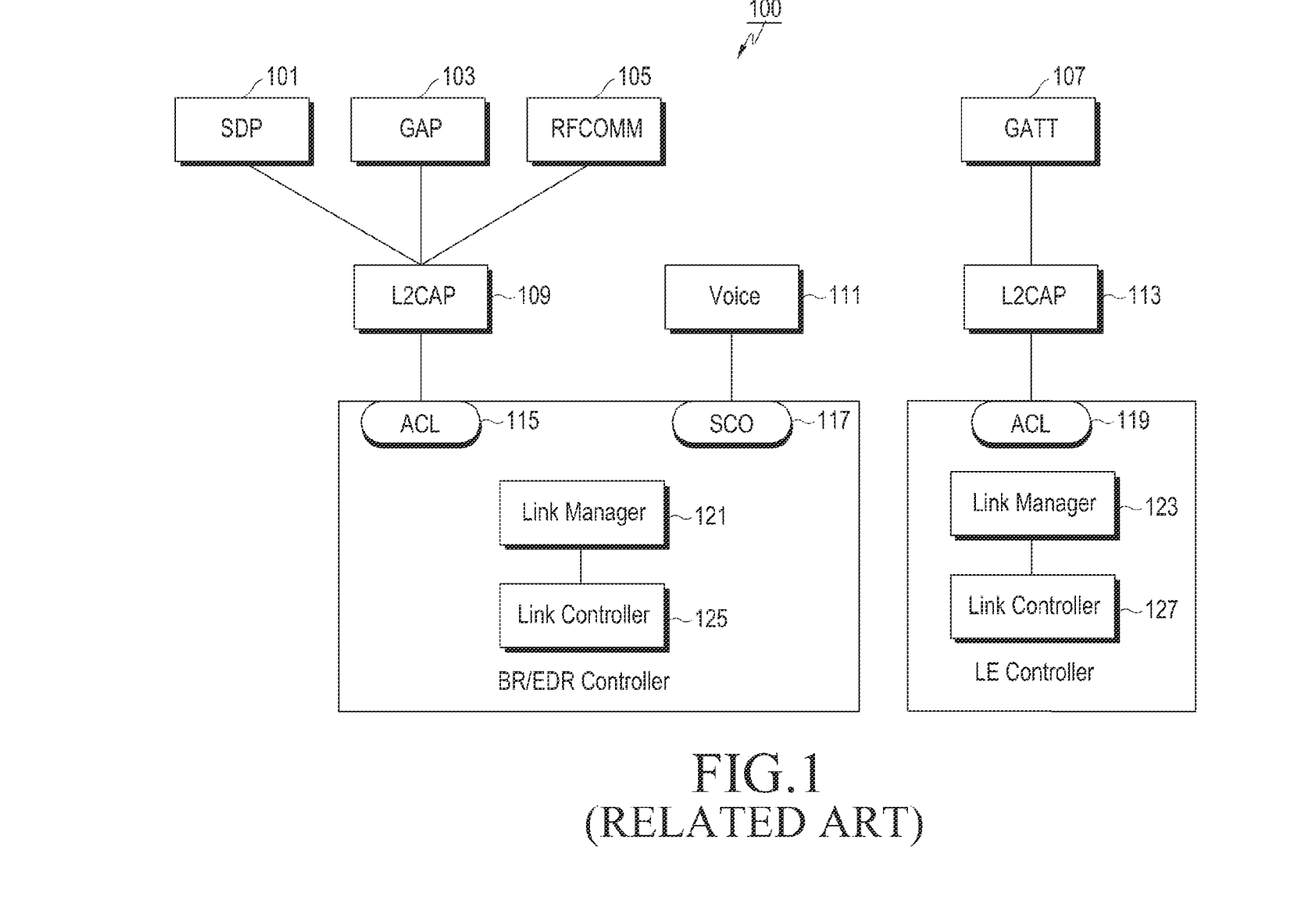
FIG. 1 is a diagram illustrating a protocol stack of BLE.

FIG. 1 illustrates a protocol stack of BLE. For more details of the BLE protocol, reference may be made to the Bluetooth 4.2 specification, which is incorporated herein by reference.

Referring to FIG. 1, in BLE, Logical Link Control and Adaptation Protocol (L2CAP) layers 109 and 113 are used for mediation and arbitration between controllers (e.g., a Bluetooth basic Rate (BR)/Enhanced Data Rate (EDR) controller and a Low Energy (LE) controller) that are responsible for data processing in an upper layer protocol (e.g., a Service Discovery Protocol (SDP) layer 101, a Generic Access Profile (GAP) 103, a Radio Frequency Communication (RFCOMM) layer 105 and a Generic Attribute Profile (GATT) 107) and a lower layer protocol (e.g., a link layer, a Media Access Control (MAC) layer and a Physical (PHY) layer). If data is delivered from the upper layer protocol, the L2CAP layers 109 and 113 may mediate the delivered data, configure and manage each data for each logical channel, and deliver the configured data to the controllers (e.g., the BR/EDR controller and the LE controller). The logical channel refers to a channel that is established for the data delivered from the upper layer protocol of the L2CAP layers 109 and 113, or from an application.

In FIG. 1, the L2CAP layers 109 and 113 have low overhead so that the L2CAP layers 109 and 113 may be ported, even in the resource-limited host, such as various mobile terminals. The main role of the L2CAP layers 109 and 113 is protocol multiplexing, and segmentation and reassembly of the data delivered between the upper layer protocol and the lower layer protocol may also be performed in the L2CAP layers 109 and 113. The L2CAP layers 109 and 113 may perform even the tasks related to Quality of Service (QoS) or grouping during piconet configuration. The SDP layer 101 is a protocol for exchanging information indicating which service is available in a connected Bluetooth device and information about the available service. The GAP 103 is a protocol for providing services such as device discovery, connection models, security, authentication, association models and service search, to Bluetooth devices. The RFCOMM layer 105 may serve to emulate a serial port.

In FIG. 1, Asynchronous Connection-oriented Link (ACL) layers 115 and 119 may provide an asynchronous data communication path, and a Synchronous Connection-Oriented (SCO) layer 117 may be connected to a voice layer 111 to provide a synchronous data communication path.

In FIG. 1, the BR/EDR controller may include a link manager 121 and a link controller 125, and the LE controller may also include a link manager 123 and a link controller 127. The link managers 121 and 123 are responsible for creating, modifying and releasing logical links, and for updating parameters related to physical links between Bluetooth devices. The link controllers 125 and 127 are responsible for encoding and decoding Bluetooth packets from a data payload, and for encoding and decoding of parameters related to a physical channel, a logical transmission and a logical link. In addition, the link controllers 125 and 127 may perform link control protocol signaling.

However, the above-described BLE does not support transmission of audio data. Therefore, there is a need for a packet structure for supporting transmission of audio data even in the BLE.

SUMMARY

The present disclosure has been made to address at least the above-mentioned problems and/or disadvantages and to provide at least the advantages described below. Accordingly, an aspect of the present disclosure is to provide a method and apparatus for efficiently transmitting and receiving audio data in a BLE-based wireless communication system.

Another aspect of the present disclosure is to provide a method and apparatus for reducing overhead of a packet carrying audio data in a BLE-based wireless communication system.

In accordance with an aspect of the present disclosure, there is provided a method for transmitting audio data by a master device in a Bluetooth Low Energy (BLE)-based wireless communication system. The method includes configuring a data packet to include identification information indicating whether the audio data of the data packet is included in a payload and transmitting the data packet to at least one slave device.

In accordance with another aspect of the present disclosure, there is provided a master device in a Bluetooth Low Energy (BLE)-based wireless communication system. The master device includes a communication interface configured to perform BLE-based communication with at least one slave device and a controller configured to configure a data packet to identification information indicating whether audio data of the data packet is included in a payload and transmit the data packet to the at least one slave device.

In accordance with another aspect of the present disclosure, there is provided a method for receiving audio data by a slave device in a Bluetooth Low Energy (BLE)-based wireless communication system. The method includes receiving a BLE-based data packet from a master device and determining whether data included in a payload of the data packet is the audio data based on identification information included in the received data packet.

In accordance with another aspect of the present disclosure, there is provided a slave device in a Bluetooth Low Energy (BLE)-based wireless communication system. The slave device includes a communication interface configured to perform BLE-based communication with a master device and a controller configured to receive a BLE-based data packet from the master device and determine whether data included in a payload of the data packet is the audio data based on identification information included in the received data packet.

As described herein, a structure of a new BLE data packet with which an L2CAP layer of the BLE protocol transmits audio data is provided. Specifically, an L2CAP header of a BLE data packet, which is defined in the BLE standard, is compressed to distinguish between a data Protocol Data Unit (PDU) of a data channel including audio data and a data PDU of another channel. More specifically, an identifier including identification information is used to indicate whether audio data is included in a payload of the BLE data packet. The BLE data packet for transmission of audio data may reduce overhead of a BLE data packet. As a result, an air packet size of the BLE data packet that is actually transmitted may be reduced, thereby contributing to a reduction in power consumption of a master device and/or a slave device.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of the embodiments of the disclosure as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but are merely used to enable a clear and consistent understanding of the disclosure. Accordingly, it should be apparent to those skilled in the art that the following description of the embodiments of the present disclosure is provided for illustrative purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As defined herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
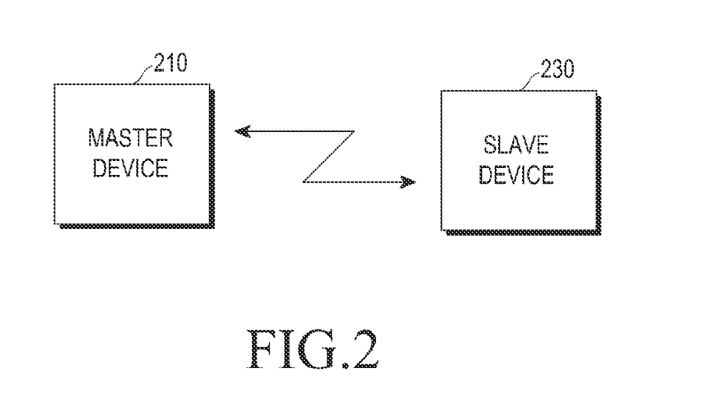
FIG. 2 is a diagram illustrating devices that transmit and receive BLE data packets with each other in a master-slave manner in a BLE-based wireless communication system, according to an embodiment of the present disclosure.

FIG. 2 is a diagram illustrating devices that transmit and receive BLE data packets with each other in a master-slave manner in a BLE-based wireless communication system, according to an embodiment of the present disclosure.

Referring to FIG. 2, in order to transmit audio data, a master device 210 generates a BLE data packet having a structure of the compressed L2CAP header and transmits the generated BLE data packet to at least one slave device 230. The master device 210 and the slave device 230 use a piconet scheme to establish a link, e.g., in a master-slave manner, to communicate with each other. In the piconet scheme, the master device 210 can configure a wireless network with a plurality of slave devices to transmit and receive a data packet to/from the slave devices. For example, in the field of the technology in which low power consumption is required, such as a Hearing Aid (HA) and the like, if the BLE data packet, which has the structure of the compressed L2CAP header, is used, it is possible not only to reduce power consumption of the slave device 230, but also to significantly increase the possible operating time of the slave device 230. In the BLE technology, a device may be referred to as a Low Energy (LE) device.

For a better understanding of the present disclosure, a structure of the existing BLE data packet in the BLE technology will be first described.

Figure 3:
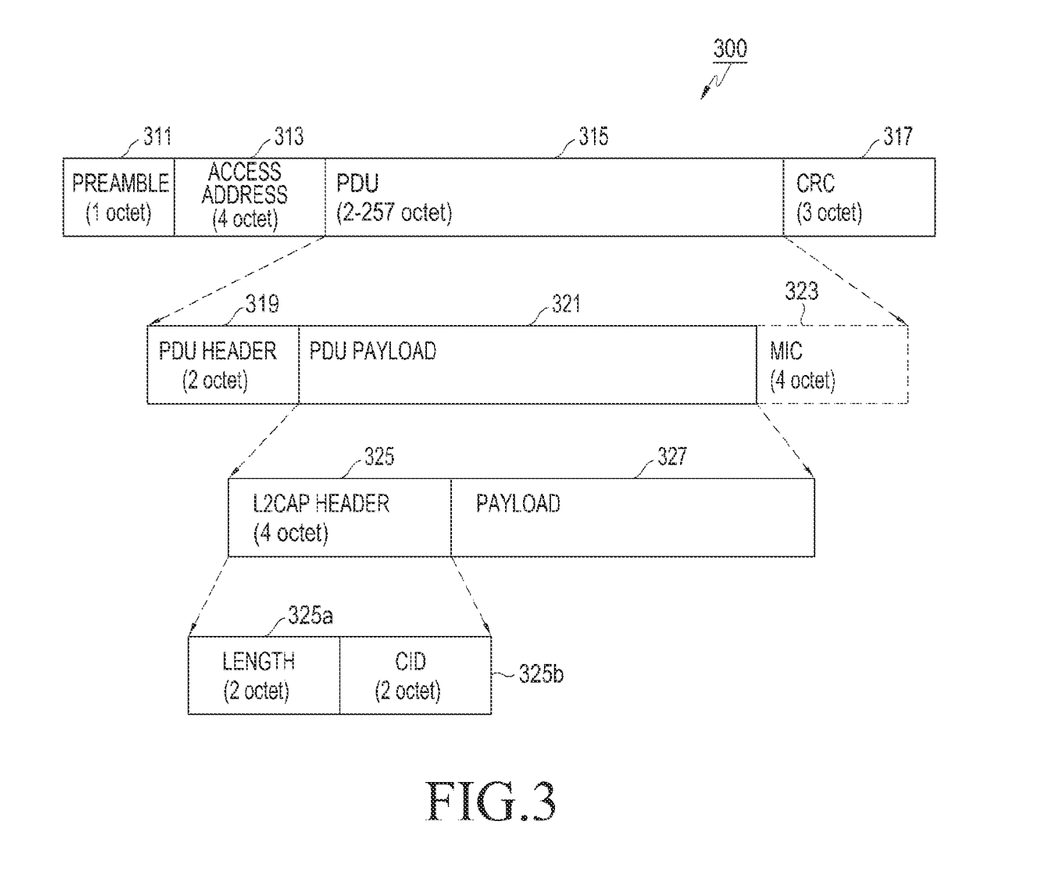
FIG. 3 is a diagram illustrating a known structure of a BLE data packet defined in the Bluetooth SIG core specification.

FIG. 3 is a diagram illustrating a structure of a BLE data packet defined in the Bluetooth SIG core specification. This is a structure of a BLE data packet that is defined in, for example, Section 2.1, Vol 6. Part B, Bluetooth SIG Core Specification version 4.2.

The BLE data packet 300 in FIG. 3 is a link layer packet format, and the BLE data packet 300 includes a preamble 311, an access address 313, a PDU 315, and a Cyclic Redundancy Check (CRC) 317. The preamble 311 is used in a receiver (e.g., the slave device 230) to perform frequency synchronization, symbol timing estimation and Automatic Gain Controller (AGC) training and the like, and has a length of 1 octet. The access address 313 is an address for synchronization of a physical link and is used for distinguishing each link. The access address 313 has a length of 4 octets. When the packet 300 is transmitted in a physical data channel, the PDU 315 is a PDU of the data channel and has a length of 2 to 257 octets. The CRC 317 is used for error correction and has a length of 3 octets.

In FIG. 3, the PDU 315 includes a PDU header 319, a PDU payload 321, and a Message Integrity Check (MIC) 323. The PDU header 319 includes 16 bits (i.e., 2 octets). The PDU payload 321 is a data payload with a variable length. The MIC 323, which may be included in the PDU 315 in the case of encrypted link layer connection, is used for integrity check and has a length of 4 octets. In FIG. 3, the PDU payload 321 includes an L2CAP header 325 and a payload 327. The L2CAP header 325 includes a length field 325a of 2 octets and a Channel Identifier (CID) field 325b of 2 octets. The L2CAP header 325 has a length of a total of 4 octets. The payload 327 may include data that is received or delivered from/to the upper layer protocol.

The overhead required in the existing structure for transmitting an (encrypted) data packet, e.g., the BLE data packet 300 in FIG. 3, is a total of 18 octets (144 bits)=preamble 311 (1 octet)+access address 313 (4 octet)+PDU header 319 (2 octet)+L2CAP header 325 (4 octet)+MIC 323 (4 octet)+ CRC 317 (3 octet), which is relatively large with respect to data packets. Even in a case where the MIC 323 (4 octet) is not transmitted, the structure of the BLE data packet 300 has an overhead of a total of 14 octets (112 bits). Assuming that this BLE data packet structure has audio frame duration of 10 ms and supports the sound quality of 32 kbps, a required payload per packet of an audio stream is 320 bits. Thus, the required payload corresponds to 31% (or 25.9% if the MIC 323 is not transmitted) of the air packet size per (encrypted) BLE data packet, so if the existing BLE data packet structure in FIG. 3 is used, the power consumption by the overhead is considerable. Therefore, in a case where a device, such as a Hearing Aid (HA), whose key requirement is low power consumption, uses BLE, it is important to reduce the overhead of the BLE data packet that is transmitted and received by the device.

Figure 4:
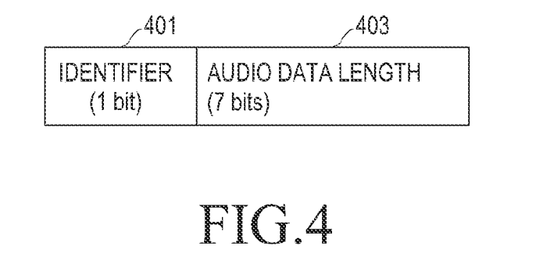
FIG. 4 is a diagram illustrating a structure of an identifier including identification information indicating whether audio data is included in a payload in a BLE-based wireless communication system, according to an embodiment of the present disclosure.

FIG. 4 is a diagram illustrating a structure of an identifier including identification information indicating whether audio data is included in a payload in a BLE-based wireless communication system, according to an embodiment of the present disclosure. Using this structure, it is possible to make an L2CAP header in which overhead of is reduced when compared to the L2CAP header 325 shown in FIG. 3.

Referring to FIG. 4, a compressed L2CAP header includes an identifier field 401 of 1 bit and a length field 403 of 7 bits. The L2CAP header in FIG. 4 is made by compressing the existing L2CAP header 325 including the length field 325a of 2 octets and the CID field 325b of 2 octets into an L2CAP header having a length of 1 octet, in terms of the length. If a BLE data packet is transmitted using the compressed L2CAP header having the structure in FIG. 4, the overhead may be reduced from the existing 144 bits to 120 bits, so the ratio of the overhead to the air packet size may be reduced from 31% to 27.3% (or from 25.9% to 21.6% if the MIC 323 is not transmitted).

In the existing L2CAP header 325, the length field 325a of 2 octets represents the length (or size) of the payload 327 except for the length of the L2CAP header 325, and the CID field 325b of 2 octets is used to identify a destination channel endpoint of the packet. However, in the BLE standard supporting BLE and an HA, the L2CAP layer of the protocol stack needs only to determine whether a payload of the data packet is a payload of a data PDU including audio data for the HA. Therefore, the 1-bit identifier field 401 used for determining whether data included in the payload is audio data may be included in the L2CAP header, replacing the CID field 325b used in the existing L2CAP header 325.

If the slave device 230 in FIG. 2 is an HA, the maximum quality used to support the HA is 64 kbps, and the maximum audio data transmitted per packet is 640 bits, thus a total of 7 bits are used for the length field 403 in FIG. 4. Therefore, given that the packet is a BLE data packet carrying audio data, the existing L2CAP header 325 of 4 octets may be compressed into the L2CAP header of 1 octet, as shown in the FIG. 4.

On the other hand, the 1-bit identifier field 401 may be used to indicate/determine whether the data included in the payload is audio data, by the L2CAP layers 109 and 113, which are used for performing multiplexing in the Bluetooth protocol stack of FIG. 1. As another example, it is also possible to configure the BLE data packet so that identification information corresponding to the 1-bit identifier field 401 may be independently included therein, regardless whether the L2CAP header is compressed or not. The identification information may be included in the existing L2CAP header, or in another specified position of the BLE data packet.

Figure 5A:
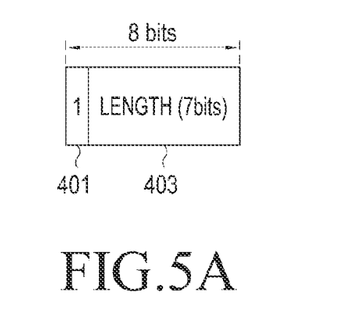
FIGS. 5A and 5B are diagrams illustrating an operation of an L2CAP layer that uses an L2CAP header compressed by using an identifier including identification information indicating whether audio data is included in a payload in a BLE-based wireless communication system, according to an embodiment of the present disclosure.
Figure 5B:
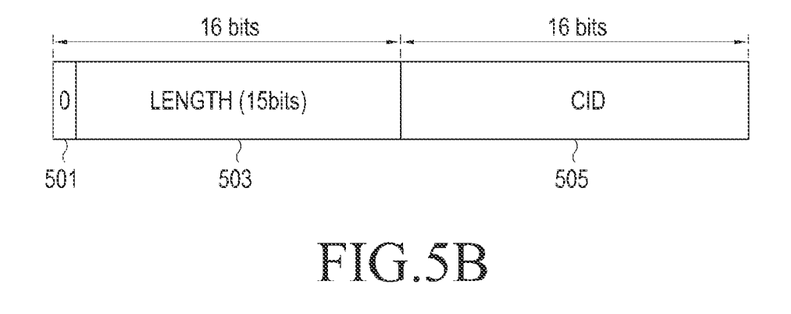

FIGS. 5A and 5B are diagrams illustrating an operation of an L2CAP layer that uses an L2CAP header compressed by using an identifier including identification information indicating whether audio data is included in a payload in a BLE-based wireless communication system, according to an embodiment of the present disclosure.

FIG. 5A illustrates an L2CAP header having a length of 1 octet, which is proposed in the example of FIG. 4, and is compressed by using an identifier including identification information indicating whether audio data is included in a payload.

Upon receiving a BLE data packet, a slave device supporting an HA determines whether data included in a payload is audio data or data of another channel, based on one Most Significant Bit (MSB) bit of the L2CAP header following the PDU header. For example, if the 1-bit identifier field 401 (i.e., MSB) is set to '1', as shown in FIG. 5A, the slave device determines that the data included in the payload of the BLE data packet is audio data, checks the size of the audio data using the length field 403 following the 1-bit identifier field 401, and delivers the determined audio data to the audio layer 107 in the protocol stack of FIG. 1. If an identifier field 501 (i.e., MSB) is set to '0', as shown in FIG. 5B, the slave device determines that the data included in the payload of the BLE data packet as data of other channel, and performs an operation of the existing L2CAP layer. In the case of FIG. 5B, since the data included in the payload of the BLE data packet is not audio data, the L2CAP header includes the 1-bit identifier field 501, a 15-bit length field 503 indicating a length of data carried on the payload, and a CID field 505 like the existing CID field 325*b*. Alternatively, if the data included in the payload of the BLE data packet is not audio data, it is also possible to use the existing L2CAP header 325 intact.

For the above-described operation of the slave device, depending on whether the data to be transmitted is audio data, a master device supporting an HA may configure, if the data is audio data, a compressed BLE data packet that includes, for example, the 1-bit identifier field 401 that is set to '1' and the 7-bit length field 403 indicating a length of audio data carried on the payload, as shown in FIG. 5A, and transmit the configured BLE data packet. If the data to be transmitted is not audio data, the master device may configure the L2CAP header as shown in FIG. 5B and transmit the configured L2CAP header, or may transmit the existing L2CAP header 325.

Figure 6:
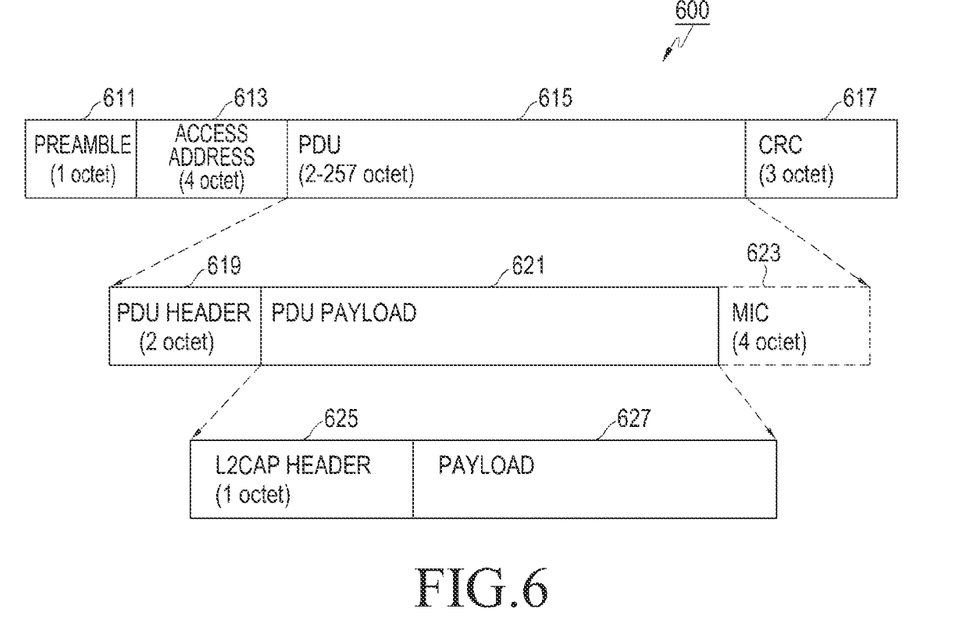
FIG. 6 is a diagram illustrating a structure of a BLE data packet in a BLE-based wireless communication system, according to an embodiment of the present disclosure.

FIG. 6 is a diagram illustrating a structure of a BLE data packet in a BLE-based wireless communication system, according to an embodiment of the present disclosure.

Similar to the BLE data packet 300 shown in FIG. 3, a BLE data packet 600 in FIG. 6 includes a preamble 611, an access address 613, a PDU 615 and a CRC 617. Accordingly, a detailed description of these components will be omitted. As described in the examples of FIGS. 4-5B, if data included in a payload is audio data, the L2CAP header 625 includes, for example, a 1-bit identifier field 401 that is set to '1' and a 7-bit length field 403 indicating a length of its audio data. On the other hand, if the data included in the payload is data of another channel, the L2CAP header 625 may be configured to include, for example, a 1-bit identifier field 501 that is set to '0', a 15-bit length field 503 and a CDI field 505, or the existing L2CAP header 325 may be used.

In a case where the compressed L2CAP header is configured as in the examples of FIGS. 4-5B, if the size of a data PDU of another channel, which is not audio data for the HA, exceeds, for example, 128 bytes, a collision may occur between the identifier fields 401 and 501 of the compressed L2CAP header and the data of the another channel, thereby causing a situation where it is not possible to distinguish between the audio data and the data of the another channel. In accordance with an embodiment of the present disclosure, the L2CAP header may be compressed by using an identifier including identification information indicating whether audio data is included in a payload, thereby making it possible to prevent the collision.

Figure 7A:
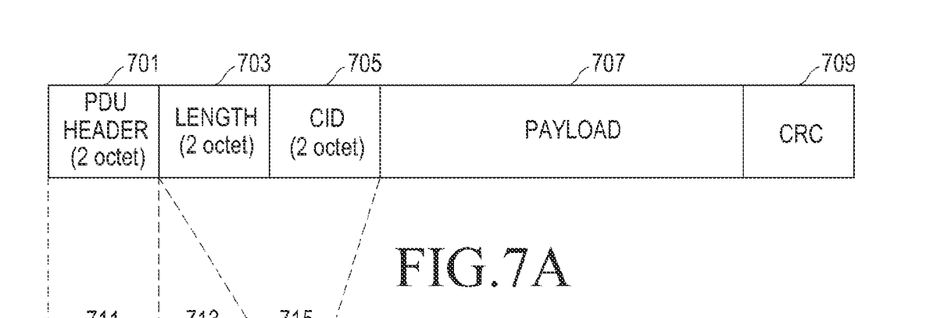
FIGS. 7A and 7B are diagrams illustrating another structure of an L2CAP header compressed by using an identifier including identification information indicating whether audio data is included in a payload in a BLE-based wireless communication system, according to an embodiment of the present disclosure.
Figure 7B:
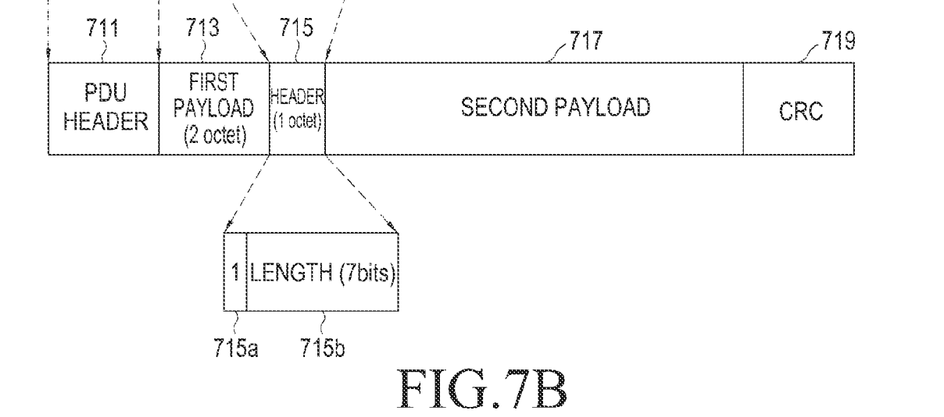

FIGS. 7A and 7B illustrate another structure of an L2CAP header compressed by using an identifier including identification information indicating whether audio data is included in a payload in a BLE-based wireless communication system, according to an embodiment of the present disclosure.

FIG. 7A illustrates a packet structure based on the existing BLE standard, which includes a PDU header 701 of 2 octets, an L2CAP header that includes a length field 703 of 2 octets and a CID 705 of 2 octets, a payload 707 and a CRC 709. These fields are the same as their corresponding fields in FIG. 3, so a detailed description thereof will be omitted.

FIG. 7B illustrates a packet structure including a compressed L2CAP header with another structure, wherein the packet structure includes a PDU header 711, an L2CAP header 715 that includes a 1-bit identifier field 715*a* and a 7-bit length field 715*b*. The packet structure is compressed using an identifier including identification information indicating whether audio data is included in a payload, a first payload 713 and a second payload 717. The compressed L2CAP header 715 that includes the 1-bit identifier field 715*a* and the 7-bit length field 715*b* is the same as the L2CAP header shown in FIG. 4, which is compressed by using an identifier including identification information indicating whether audio data is included in a payload.

As for the first payload 713 and the second payload 717, Table 2.2 in Section 2.1, Vol 3. Part A of Bluetooth SIG Core Specification version 4.2 provides that in a CID used in a BLE logical link, 0x0080 to 0xFFFF for example are not used. Therefore, if the L2CAP header 715 that is compressed by using an identifier including identification information indicating whether audio data is included in a payload is located in a first octet of the CID field 705 of the existing L2CAP header, (i.e., if the first payload 713 and the second payload 717 including audio data are located in both sides of the L2CAP header 715 and compressed by using an identifier including identification information indicating whether audio data is included in a payload, as shown in FIG. 7B), it is possible to prevent collision between audio data and data of another channel.

Figure 8:
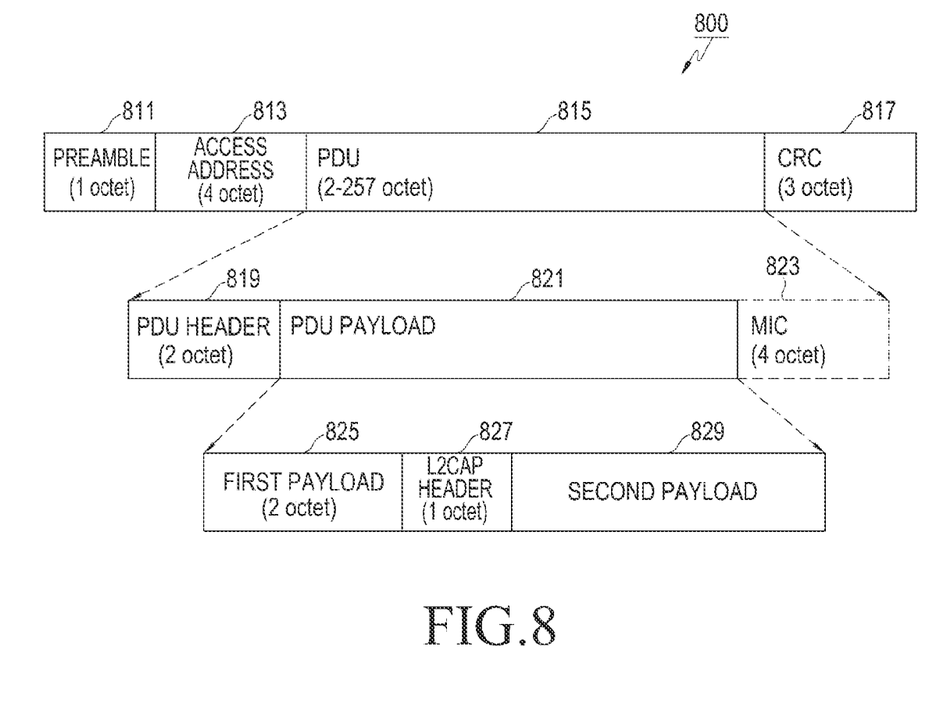
FIG. 8 is a diagram illustrating another structure of a BLE data packet in a BLE-based wireless communication system, according to an embodiment of the present disclosure.

FIG. 8 is a diagram illustrating another structure of a BLE data packet in a BLE-based wireless communication system, according to an embodiment of the present disclosure. The BLE data packet 800 shown in FIG. 8 illustrates where the L2CAP header 715 is compressed by using an identifier including identification information indicating whether audio data is included in a payload, as shown in FIG. 7B.

The BLE data packet 800 in FIG. 8, like the BLE data packet 300 in FIG. 3, includes a preamble 811, an access address 813, a PDU 815 and a CRC 817. Accordingly, a detailed description of these components will be omitted. In a separated configuration of first and second payloads 825 and 829, the first payload 825 may have a length of, for example, 2 octets. As described in the examples of FIGS. 4-5B, if data included in a payload is audio data, the L2CAP header 827 may include, for example, a 1-bit identifier field 401 that is set to '1' and a 7-bit length field 403 indicating a length of its audio data. On the other hand, if the data included in the payload is data of another channel, an L2CAP header may be configured as shown in FIG. 5B, or the existing L2CAP header 325 may be used.

Figure 9:
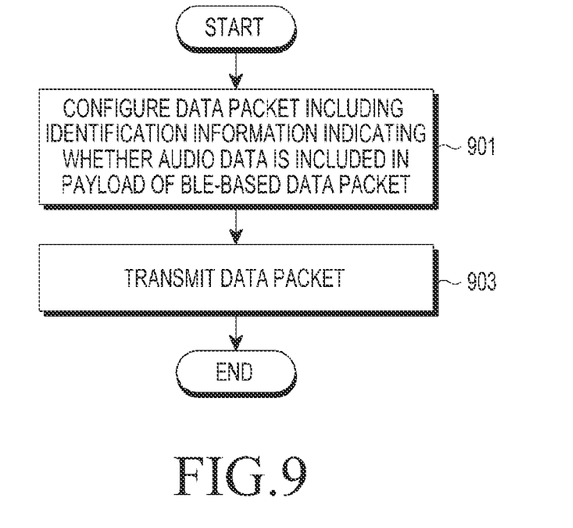
FIG. 9 is a flowchart illustrating a method for transmitting audio data by a master device in a BLE-based wireless communication system, according to an embodiment of the present disclosure.

FIG. 9 is a flowchart illustrating a method for transmitting audio data by a master device in a BLE-based wireless communication system, according to an embodiment of the present disclosure.

Referring to FIG. 9, in step 901, the master device configures a data packet including identification information indicating whether audio data is included in a payload of a BLE-based data packet. In step 903, the master device transmits the data packet to at least one slave device.

Figure 10:
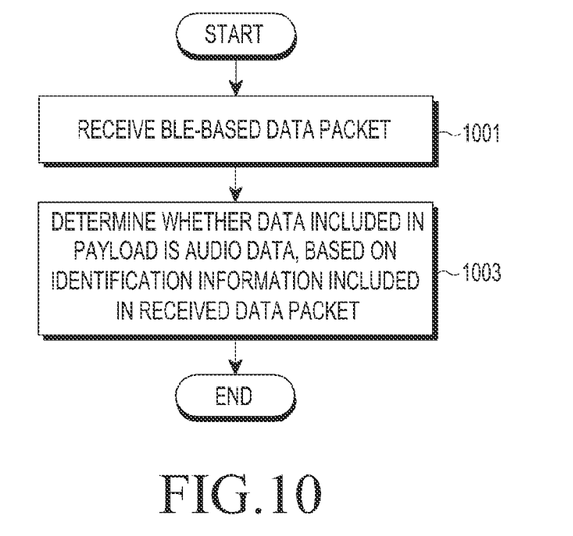
FIG. 10 is a flowchart illustrating a method for receiving audio data by a slave device in a BLE-based wireless communication system according to an embodiment of the present disclosure.

FIG. 10 is a flowchart illustrating a method for receiving audio data by a slave device in a BLE-based wireless communication system, according to an embodiment of the present disclosure.

Referring to FIG. 10, in step 1001, the slave device receives a BLE-based data packet. In step 1003, the slave device determines whether data include in a payload is audio data, based on the identification information included in the received data packet, and receives the audio data depending on the determination result.

Figure 11:
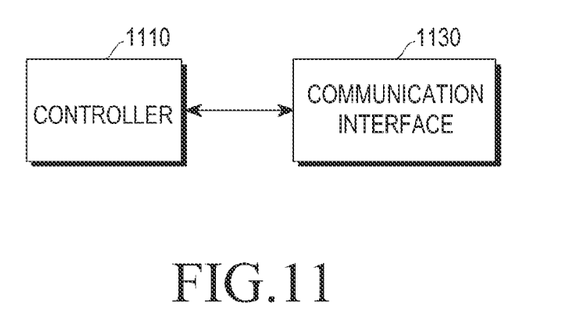
FIG. 11 is a diagram illustrating a configuration of a device in a BLE-based wireless communication system according to an embodiment of the present disclosure.

FIG. 11 is a block diagram illustrating a configuration of a device in a BLE-based wireless communication system, according to an embodiment of the present disclosure. The device configuration in FIG. 11 may be applied to each of the master device and the slave device.

Referring to FIG. 11, a controller 1110 controls transmitting or receiving of a BLE data packet including audio data depending on the BLE data packet structure and a data transmission/reception method according to an embodiment of the present disclosure, which have been described in the examples of FIGS. 2 to 10. A communication interface 1130 includes a communication module for performing BLE-based data transmission/reception with a counterpart device (e.g., a master device or a slave device).

The aforementioned components of the master and slave devices, which are configured to perform the steps of the methods described above, can be implemented using hardware (e.g., electrical circuitry), software (e.g., various modules) and a combination thereof. Moreover, the components can be provided on one and/or multiple layers of a System on Chip (SoC).

While the present disclosure has been shown and described with reference to certain embodiments thereof, it should be understood by those skilled in the art that many variations and modifications of the method and apparatus described herein will still fall within the scope of the present disclosure as defined in the appended claims and their equivalents.

What is claimed is:

1. A method for transmitting audio data by a master device in a Bluetooth Low Energy (BLE)-based wireless communication system, the method comprising:
   configuring a BLE-based data packet to include identification information indicating that the audio data is included in a payload of the BLE-based data packet, wherein the BLE-based data packet comprises a header and the payload, and the payload comprises a payload header; and
   transmitting the BLE-based data packet to at least one slave device,
   wherein the identification information is included in compressed header information of a Logical Link Control and Adaptation Protocol (L2CAP) layer, which is the payload header in the payload of the BLE-based data packet, and
   wherein the compressed header information of the L2CAP layer has a length of one octet and includes 1-bit length information indicating that the audio data is included in the payload and 7-bit length information indicating a length of the audio data.

2. The method of claim 1, wherein the identification information is information relating to one bit being assigned to the BLE-based data packet.

3. The method of claim 1, wherein if the BLE-based data packet does not include the audio data, the BLE-based data packet includes an L2CAP header that includes a length field of two octets and a channel identifier (CID) field of two octets.

4. The method of claim 1, wherein the identification information is included in the BLE-based data packet, and wherein the identification information is used in a multiplexing layer to indicate whether the audio data is included in the payload of the BLE-based data packet.

5. The method of claim 4, wherein the identification information is located in front of or at an end of the payload of the BLE-based data packet, or is located between separated payloads of the BLE-based data packet.

6. The method of claim 1, wherein if the BLE-based data packet includes the audio data, the payload of the BLE-based data packet includes a first payload and a second payload, which are separated from each other, and the compressed L2CAP header information is located between the first payload and the second payload.

7. The method of claim 6, wherein the L2CAP header information is located in a first octet of a field including channel identifier (CID) information, which is located in an existing header structure of the L2CAP layer of the BLE-based data packet.

8. The method of claim 1, wherein the master device supports a Hearing Aid (HA).

9. A master device for use in a Bluetooth Low Energy (BLE)-based wireless communication system, the master device comprising:
   a communication interface configured to perform BLE-based communication with at least one slave device; and
   a controller configured to configure a BLE-based data packet to include identification information indicating that audio data is included in a payload of the BLE-based data packet, and transmit the BLE-based data packet to the at least one slave device,
   wherein the BLE-based data packet comprises a header and the payload, and the payload comprises a payload header,
   wherein the identification information is included in compressed header information of a Logical Link Control and Adaptation Protocol (L2CAP) layer, which is the payload header in the payload of the BLE-based data packet, and
   wherein the compressed header information of the L2CAP layer has a length of one octet and includes 1-bit length information indicating that the audio data is included in the payload and 7-bit length information indicating a length of the audio data.

10. The master device of claim 9, wherein the identification information is information relating to one bit being assigned to the BLE-based data packet.

11. The master device of claim 9, wherein if the BLE-based data packet does not include the audio data, the BLE-based data packet includes an L2CAP header that includes a length field of two octets and a channel identifier (CID) field of two octets.

12. The master device of claim 9, wherein the identification information is included in the BLE-based data packet, and
   wherein the identification information is used in a multiplexing layer to indicate whether the audio data is included in the payload of the BLE-based data packet.

13. The master device of claim 12, wherein the identification information is located in front of or at the end of the payload of the BLE-based data packet, or is located between separated payloads of the BLE-based data packet.

14. The master device of claim 9, wherein if the BLE-based data packet includes the audio data, the payload of the BLE-based data packet includes a first payload and a second payload, which are separated from each other, and the compressed L2CAP header information is located between the first payload and the second payload.

15. The master device of claim 14, wherein the L2CAP header information is located in a first octet of a field including channel identifier (CID) information, which is located in an existing header structure of the L2CAP layer of the BLE-based data packet.

16. The master device of claim 9, wherein the master device supports a Hearing Aid (HA).

17. A method for receiving audio data by a slave device in a Bluetooth Low Energy (BLE)-based wireless communication system, the method comprising:
 receiving a BLE-based data packet from a master device; and
 determining that data included in a payload of the BLE-based data packet is the audio data based on identification information included in the received BLE-based data packet,
 wherein the BLE-based data packet comprises a header and the payload, and the payload comprises a payload header,
 wherein the identification information is included in compressed header information of a Logical Link Control and Adaptation Protocol (L2CAP) layer, which is the payload header in the payload of the BLE-based data packet, and
 wherein the compressed header information of the L2CAP layer has a length of one octet and includes 1-bit length information indicating that the audio data is included in the payload and 7-bit length information indicating a length of the audio data.

18. The method of claim 17, wherein the identification information is information of relating to one bit being assigned to the BLE-based data packet.

19. The method of claim 17, wherein if the BLE-based data packet does not include the audio data, header information of the BLE-based data packet is an L2CAP header that includes a length field of two octets and a channel identifier (CID) field of two octets.

20. The method of claim 17, wherein the identification information is included in the BLE-based data packet, and
 wherein the method further comprises determining whether the audio data is included in the payload based on the identification information in the L2CAP layer.

21. The method of claim 20, wherein the identification information is located in front of or at the end of the payload of the BLE-based data packet, or located between separated payloads of the BLE-based data packet.

22. The method of claim 17, wherein if the BLE-based data packet includes the audio data, the payload of the BLE-based data packet includes a first payload and a second payload, which are separated from each other, the identification information is included in the compressed header information of the L2CAP layer of the BLE-based data packet, and the compressed L2CAP header information is located between the first payload and the second payload.

23. The method of claim 22, wherein the L2CAP header information is located in a first octet of a field including channel identifier (CID) information, which is located in an existing header structure of the L2CAP layer.

24. The method of claim 17, wherein the slave device supports a Hearing Aid (HA).

25. A slave device in a Bluetooth Low Energy (BLE)-based wireless communication system, the slave device comprising:
 a communication interface configured to perform BLE-based communication with a master device; and
 a controller configured to receive a BLE-based data packet from the master device, and determine that data included in a payload of the BLE-based data packet is the audio data based on identification information included in the received BLE-based data packet,
 wherein the BLE-based data packet comprises a header and the payload, and the payload comprises a payload header,
 wherein the identification information is included in compressed header information of a Logical Link Control and Adaptation Protocol (L2CAP) layer, which is the payload header in the payload of the BLE-based data packet, and
 wherein the compressed header information of the L2CAP layer has a length of one octet and includes 1-bit length information indicating that the audio data is included in the payload and 7-bit length information indicating a length of the audio data.

26. The slave device of claim 25, wherein the identification information is information of relating to one bit being assigned to the BLE-based data packet.

27. The slave device of claim 25, wherein if the BLE-based data packet does not include the audio data, header information of the BLE-based data packet is an L2CAP header that includes a length field of two octets and a channel identifier (CID) field of two octets.

28. The slave device of claim 25, wherein the identification information is included in the BLE-based data packet, and
 wherein the controller is further configured to determine whether the audio data is included in the payload based on the identification information in the L2CAP layer.

29. The slave device of claim 28, wherein the identification information is located in front of or at the end of the payload of the BLE-based data packet, or located between separated payloads of the data payload.

30. The slave device of claim 25, wherein if the BLE-based data packet includes the audio data, the payload of the BLE-based data packet includes a first payload and a second payload, which are separated from each other, and the compressed L2CAP header information is located between the first payload and the second payload.

31. The slave device of claim 30, wherein the L2CAP header information is located in a first octet of a field including channel identifier (CID) information, which is located in an existing header structure of the L2CAP layer, and
 wherein the first payload has a length of two octets.

32. The slave device of claim 25, wherein the slave device supports a Hearing Aid (HA).

33. A System on Chip (SoC), the SoC comprising:
 a hardware communication interface circuit configured to perform Bluetooth Low Energy (BLE)-based communication with at least one slave device; and
 a hardware controller circuit configured to configure a BLE-based data packet to include identification information indicating that audio data is included in a payload of the BLE-based data packet, and transmit the BLE-based data packet to the at least one slave device,
 wherein the BLE-based data packet comprises a header and the payload, and the payload comprises a payload header,
 wherein the identification information is included in compressed header information of a Logical Link Control and Adaptation Protocol (L2CAP) layer, which is the payload header in the payload of the BLE-based data packet, and wherein the compressed header information of the L2CAP layer has a length of one octet and includes 1-bit length information indicating that the audio data is included in the payload and 7-bit length information indicating a length of the audio data.

34. A System on Chip (SoC), the SoC comprising:

a hardware communication interface circuit configured to perform Bluetooth Low Energy (BLE)-based communication with a master device; and a hardware controller circuit configured to receive a BLE-based data packet from the master device, and determine that data included in a payload of the BLE-based data packet is the audio data based on identification information included in the received BLE-based data packet, wherein the BLE-based data packet comprises a header and the payload, and the payload comprises a payload header, wherein the identification information is included in compressed header information of a Logical Link Control and Adaptation Protocol (L2CAP) layer, which is the payload header in the payload of the BLE-based data packet, and wherein the compressed header information of the L2CAP layer has a length of one octet and includes 1-bit length information indicating that the audio data is included in the payload and 7-bit length information indicating a length of the audio data.

* * * * *